(12) United States Patent
Miakinen

(10) Patent No.: US 7,653,709 B1
(45) Date of Patent: Jan. 26, 2010

(54) METHOD FOR REMOTE INTERROGATION OF SNMP AGENTS

(75) Inventor: Olivier Miakinen, Vitry sur Seine (FR)

(73) Assignee: Thomson Licensing S.A., Boulogne-Billancourt Cedex (FR)

( * ) Notice: Subject to any disclaimer, the term of this patent is extended or adjusted under 35 U.S.C. 154(b) by 1970 days.

(21) Appl. No.: 09/604,919

(22) Filed: Jun. 28, 2000

(30) Foreign Application Priority Data

Jun. 28, 1999 (FR) .................................. 99 08250

(51) Int. Cl.
*G06F 15/173* (2006.01)
(52) U.S. Cl. ................... 709/223; 709/230; 709/240; 709/250; 709/237; 709/201; 709/218
(58) Field of Classification Search .............. 709/223, 709/201, 230, 240, 250, 237, 218
See application file for complete search history.

(56) References Cited

U.S. PATENT DOCUMENTS

| | | | | |
|---|---|---|---|---|
| 5,541,911 A | * | 7/1996 | Nilakantan et al. | ........... 370/422 |
| 5,822,569 A | * | 10/1998 | McPartlan et al. | ............. 703/21 |
| 6,081,838 A | | 6/2000 | Yoshihara et al. | |
| 6,212,511 B1 | * | 4/2001 | Fisher et al. | .................... 707/1 |
| 6,212,529 B1 | * | 4/2001 | Boothby et al. | .............. 707/201 |

FOREIGN PATENT DOCUMENTS

EP 0 863 645 A2 9/1998
EP 1 065 828 A1 1/2001

OTHER PUBLICATIONS

Keller, A: "Tool-based implementation of a Q-Adapter Function for the Seamless Integration of SNMP-managed Devices in TMN", NOMS 98. 1998 IEEE Network Ops and Mgt Symp. Conf. Proceedings (Cat. No. 98CH36158) NOMS 98 1998 IEEE Network Ops & Mgt Symp. New Orleans, LA, USA Feb. 15-20, 1998, pp. 400-411, vol. 2, XP000799511, 1998, NY, NY, USA, IEEE, USA ISBN: 0 7803 4351-4 p. 403, line 8-11; p. 404, paragraphs 1-9, figure; p. 406, line 1-page 407, line 16.
Moore, B. et al., "CMIP/SNMP Integration Prototype", Proceedings of the Network Operations and Management Symposium (NOMS) us NY, IEEE, vol. Symp. $, 1994, pp. 257-267, XP000452410 ISBN: 0-7803-1812-9 p. 259 & p. 261.
Application No. EP 00 40 1757 - International Search Report dated Oct. 3, 2000.

* cited by examiner

*Primary Examiner*—Dohm Chankong
*Assistant Examiner*—Lan-Dai T Truong
(74) *Attorney, Agent, or Firm*—Miles & Stockbridge P.C.; David R. Schaffer, Esq.

(57) ABSTRACT

The invention relates to a method for processing a complex request addressed to at least one SNMP agent (5) of a resource machine (2b) from an SNMP manager (4) of an application machine (2a). The complex request is processed so as to enable an integrating agent (6) to translate the complex request into SNMP requests and to optimize the number of SNMP requests transmitted through the network (3), particularly the number of GETNEXT requests.

50 Claims, 2 Drawing Sheets

METHOD FOR REMOTE INTERROGATION OF SNMP AGENTS

FIELD OF THE INVENTION

The present invention relates to a method for the remote interrogation of SNMP agents in a computer system.

DESCRIPTION OF RELATED ART

The protocol SNMP (Simple Network Management Protocol) from the TCP/IP family of protocols is used to manage one machine from another machine via the Internet. The SNMP protocol allows a machine comprising an SNMP manager to communicate through a network, using an SNMP-type network protocol, with another machine comprising an SNMP agent. A UDP port and an IP address are used to address an SNMP agent from an SNMP manager. The SNMP agent manages SNMP objects characterized by attributes.

Complex management protocols like the protocol CMIP (Common Management Information Protocol) make it possible to make global requests using complex filters. The complex filters exist in the form of a boolean search expression applied to the attributes of objects, or more precisely, a set of conditions on the attributes (equality, order relations, character string inclusions, etc.) combined with one another by any type of operator (AND, OR, NOT, IMPLIES, etc.).

Unlike such protocols, the SNMP protocol is constituted by three rudimentary commands and a message (GET, GET-NEXT, SET and TRAP). It knows only two types of requests for retrieving information on the attributes of objects: the requests GET and GETNEXT). The SNMP protocol is qualified as a simple protocol, as opposed to complex protocols such as the CMIP protocol. The commands GET and GET-NEXT are requests sent by the SNMP manager of one machine to an SNMP object of another machine through a network.

A problem arises when a manager sends a complex request of the CMIP type in order to consult and/or modify an object managed by an SNMP agent. The SNMP protocol is too limited to handle complex management operations of the CMIP type.

Currently, in order to respond to such a problem, the system must scan all of the objects involved in the CMIP request and save only the results that respond to this request.

As computers become or more powerful, the number of objects managed by agents becomes greater and greater. For example, more and more printers or files are managed by the same computer. The number of requests increases. This results in a heavy load on the network, and increased costs and response times.

Furthermore, the interrogation of many instances can result in intensive utilization of the network and degrade the performance of the computer interrogated.

An object of the present invention is to optimize the processing of any type of complex request addressed to an SNMP agent.

SUMMARY OF THE INVENTION

In this context, the present invention proposes a method for processing a complex request addressed to at least one SNMP agent of a resource machine of a computer system from a complex protocol manager of an application machine, each agent managing attribute tables belonging to the resource machine, the instances of the tables being referenced by identifiers comprising indexes, characterized in that it consists of:

transforming a filter F1 derived from the complex request into a simplified filter F2 comprising only conditions on indexes, the filter F2 corresponding to the following matching characteristics: the filter F2 lets through all the SNMP requests whose responses could verify the filter F1, but filters out all the SNMP requests whose responses cannot in any way verify the filter F1;

limiting the SNMP requests to those that comply with the filter F2, and applying the filter F1 to the responses.

The present invention also relates to the system for implementing said method.

BRIEF DESCRIPTION OF THE DRAWINGS

Other characteristics and advantages of the invention will become clear in light of the following description, given as an illustrative and non-limiting example of the present invention, in reference to the attached drawings in which.

DESCRIPTION OF AN EMBODIMENT OF THE INVENTION

Figure 1:
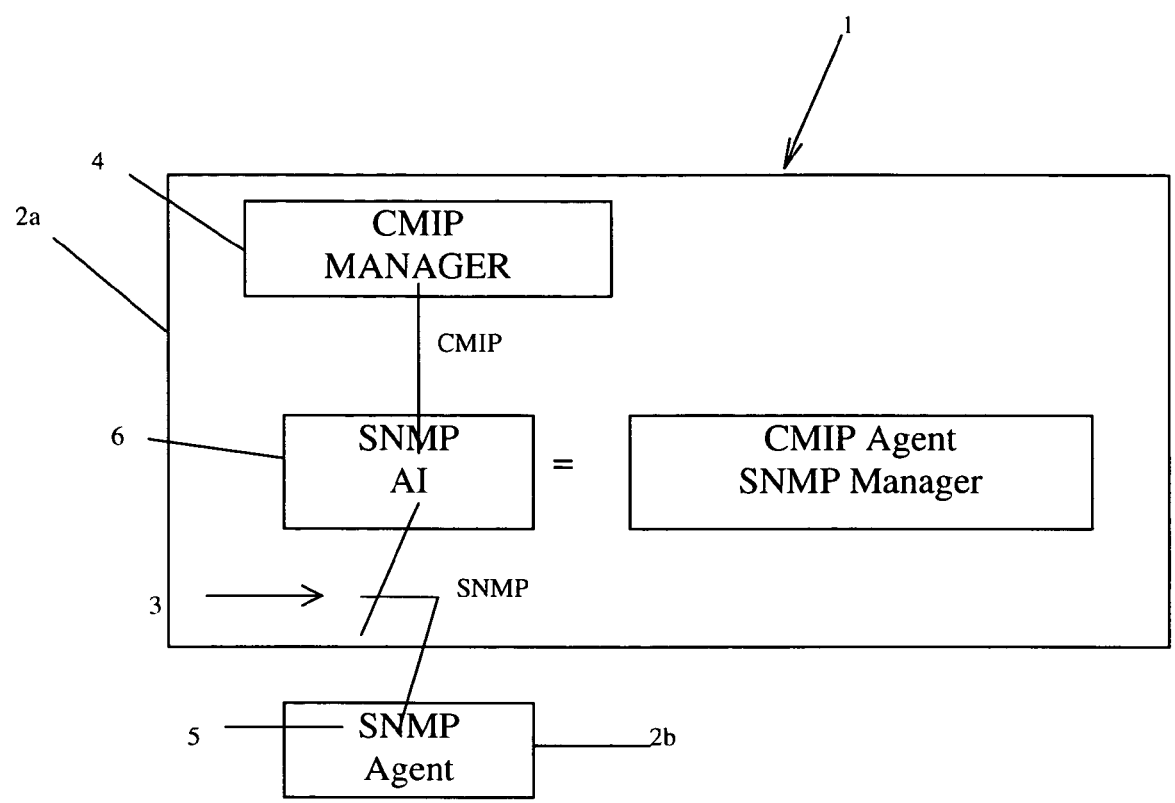
FIG. 1 is a schematic view of an embodiment of the system according to the invention.

As shown in FIG. 1, the computer system 1 is distributed and composed of machines 2a, 2b organized into one or more networks 3. A machine 2 is very large conceptual unit that includes both hardware and software. The machines can be quite diverse, such as workstations, servers, routers, specialized machines and gateways between networks. Only the components of the machines 2 of the system 1 that are characteristic of the present invention will be described, the other components being known to one skilled in the art.

As shown in FIG. 1, in the present invention, the computer system 1 comprises a machine 2a called an application machine associated with at least one application and at least one machine 2b called a resource machine capable of managing at least one resource. The application machine 2a includes a manager 4 of a complex CMIP type protocol. The resource machine 2b includes an SNMP agent 5. The manager 4 dialogs with an agent integrator 6 using the complex CMIP type protocol. The term "complex" will be defined below. In the embodiment illustrated, the agent integrator 6 is part of the application machine 2a. Any other embodiment can be implemented; for example the agent integrator 6 could be part of a machine independent of both the application machine 2a and the resource machine 2b. The SNMP agent 5 communicates with the agent integrator 6 through the network 3 using the SNMP protocol. The agent integrator 6 translates the complex protocol into the SNMP protocol. The manager 4 transmits complex CMIP type requests to the agent integrator 6, which translates them into simple SNMP requests sent to the SNMP agent 5 in question.

Figure 2:
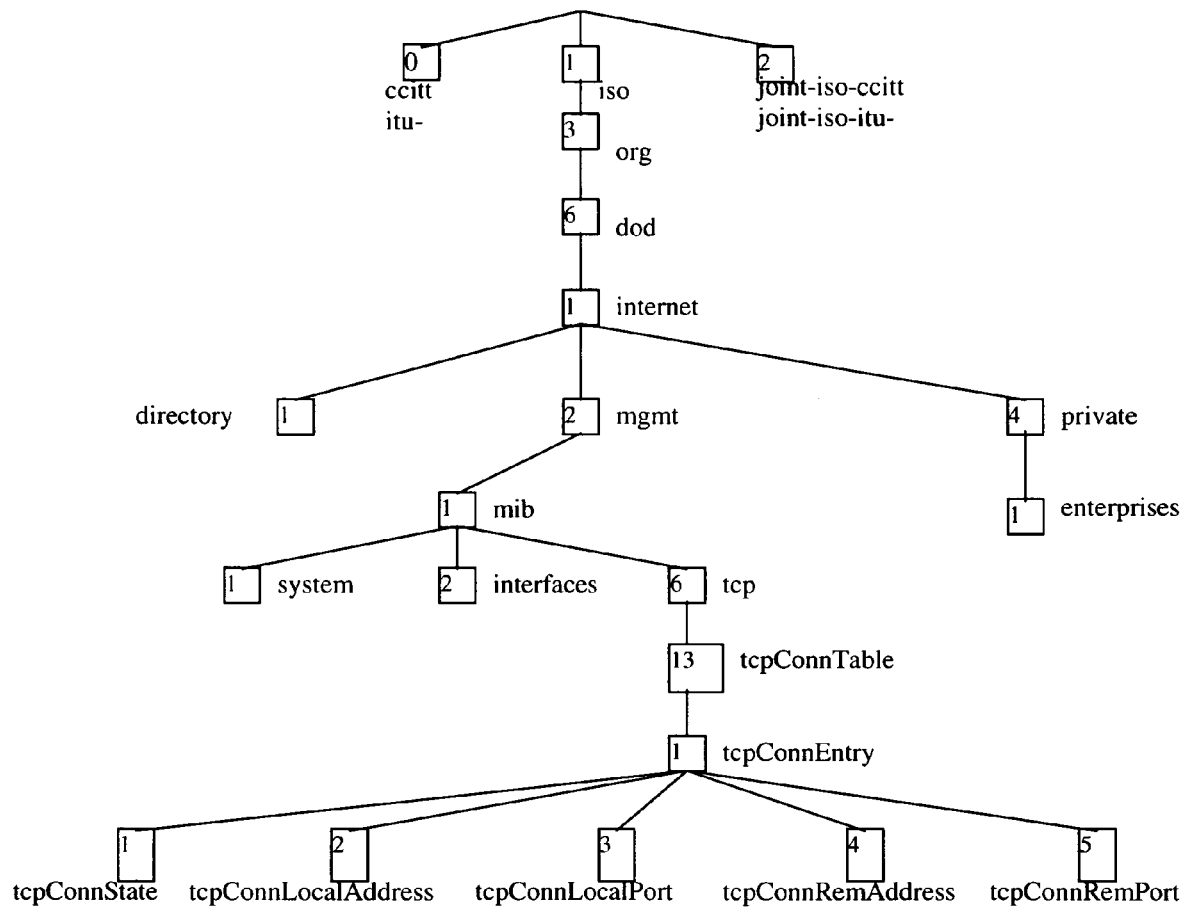
FIG. 2 partially represents a tree of attribute identifiers managed by the system represented in FIG. 1.

It is noted that an SNMP agent of a resource machine 2b manages an MIB (Management Information Base) that organizes SNMP attributes in tree form. An SNMP attribute is ordered in a tree by an identifier OID (Object Identifier); it has a given type such as integer, character string, etc. and has a value at a given time. FIG. 2 represents a tree of identifiers; the attribute 'tcpConnState' has the identifier 1.3.6.1.2.1.6.13.1.1.

An SNMP agent can manage unique global SNMP objects such as the global percentage of consumption of the processor or processors of the resource machine, and multiple SNMP objects such as an application's percentage of CPU consumption. In the latter case, there are as many instances of this type of SNMP object (an application's percentage of CPU consumption) managed by the SNMP agent as there are applications in the machine. The object is said to be multi-instantiated and is represented by an "SNMP table." When the SNMP agent integrator interrogates SNMP tables comprising numerous instances, it uses a request and response mechanism.

In the following description, the term "attribute" is used to designate in SNMP object and a CMIS (Common Management Information Service) attribute; the term "table" is used to designate an SNMP table and a CMIS object.

The following description uses the example of an SNMP connection table, named tcpConnTable. As shown in FIG. 2, the table "tcpConnTable" related to the existing TCP connections is designated by an identifier 1.3.6.1.2.1.6.13. 1.3 is set by the ISO. 1.3.6.1 designates Internet. 1.3.6.1.2.1 Designates the standard MIB (mib-II). 1.3.6.1.2.1.6 designates TCP, 1.3.6.1.2.1.6.13 designates the connection table (the standard MIB mib-II and the TCP connection table are defined in RFC-1213 (RFC—Request For Comments). The table "tcpConnTable" comprises five attributes:

tcpConnState (OID: 1.3.6.1.2.1.6.13.1.1);
tcpConnLocalAddress (OID: 1.3.6.1.2.1.6.13.1.2);
tcpConnLocalPort (OID: 1.3.6.1.2.1.6.13.1.3.);
tcpConnRemAddress (OID: 1.3.6.1.2.1.6.13.1.4);
tcpConnRemPort (OID: 1.3.6.1.2.1.6.13.1.5);

The attributes tcpConnLocalAddress, tcpConnLocalPort, tcpConnRemAddress, tcpConnRemPort are index attributes. The concatenation of the identifier of an attribute with the values, in order, of all the index attributes gives the identifier of a particular instance of this attribute. Annex 1 gives an example of the values of said table: in this example, the table includes 41 instances. For example, the identifier of the 37th instance of the attribute tcpConnState is:

tcpConnState.219.182.165.53.1021.219.182.165.55.513
wherein:

tcpConnLocalAddress.219.182.165.53.1021.219.182.165.55.513, has the value 219.182.165.53; this value is identical to the component of the identifier ($1^{st}$ index) that corresponds to the index attribute tcpConnLocalAddress. The attribute tcpConnState is not an index attribute: it is ordered by means of the index attributes.

In this example (Annex 1), the attribute tcpConnState is of the integer type, and the first instance has a value equal to 1 at a given time t. In the embodiment of FIG. 1, it the SNMP manager sends a GET on the first instance of the attribute tcpConnState of the resource machine 2b, the SNMP agent of the resource machine 2b responds that the value of the attribute tcpConnState is 1, i.e. that the status of the connection is closed. The SNMP manager can perform a GETNEXT on the first instance of the attribute tcpConnState. The SNMP agent responds that the value sought is that of the attribute whose identifier (1.3.6.1.2.1.6.13.1.1.0.0.0.0.7.0.0.0.0.0) follows, in increasing order, the identifier of the first instance of the attribute tcpConnState (1.3.6.1.2.1.6.13.1.1.0.0.0.0.0.0.0.0.0). In the present example, the attribute whose identifier follows the identifier of the first instance of the attribute tcpConnState is the second instance of the attribute tcpConnState. The SNMP agent installed in the resource machine 2b responds that the value of the next instance, i.e. the second instance of the attribute tcpConnState, is 2, and so on for all the instances of the connection table until an identifier is reached that designates another type of SNMP attribute such as, in this example, tcpConnLocalAddress.

The GET command makes it possible to read the value of one (or several) attribute(s) whose existence is already known (known identifier). Only the GETNEXT command makes it possible to retrieve other instances by using the fact that all the instances are ordered. The GETNEXT command makes it possible to scan an entire instance table with successive requests: starting at the beginning of the table, a first GETNEXT delivers the first existing instance; then, a GETNEXT on this first instance gives the second instance, and so on until the end of the table.

| 1.3.6.1.2.1.6.13.1.1 | . | 219.182.165.53 | . | 1021 | . | 219.182.165.55 | . | 513 |
|---|---|---|---|---|---|---|---|---|
| tcpConnState | | $1^{st}$ index | | $2^{nd}$ index | | $3^{rd}$ index | | $4^{th}$ index |
| identifier | | | | | | | | |

By extension, the identifier of an instance also designates all four indexes, without the name of the attribute. This identifier therefore serves to designate the instance of any attribute of the table.

The above identifier is that the 37th instance of the attribute tcpConnState. The $1^{st}$ index corresponds to the value of the 37th instance of the index attribute tcpConnLocalAddress; the $2^{nd}$ index corresponds to the value of the 37th instance of the index attribute tcpConnLocalPort; the $3^{rd}$ index corresponds to the value of the 37th instance of the index attribute tcpConnRemAddress; the $4^{th}$ index corresponds to the value of the 37th instance of the index attribute tcpConnRemPort. Thus, the last four components of the identifier of the attribute tcpConnState correspond to the values of the same instance of the four index attributes (called $1^{st}$, $2^{nd}$, $3^{rd}$ and $4^{th}$ index).

The value of the index attribute is identical to the component of the identifier corresponding to the index attribute in question ($i^{th}$ index). Thus, for example, the 37th instance of the index attribute tcpConnLocalAddress, whose identifier is In the case of a complex request related to an SNMP table, the request comprises:
the identification of the SNMP table in question;
a set of conditions on attributes (including indexes) of the table.

For example, a complex request on the TCP connection table (tcpConnTable) has all of the following conditions:
"the remote port number is 21 and the connection is active, or the local port number is greater than or equal to 1024."

All of the conditions can be represented somewhat more formally by a complex filter, for example of the CMIS type:
(OR
(AND
  tcpConnRemPort EQUAL_TO 21
  tcpConnState EQUAL_TO established (5)
)
  tcpConnLocalPort GREATER_THAN_OR_EQUAL_TO 1024
).

Figure 3:
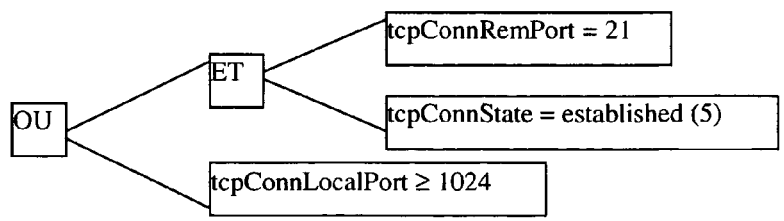
FIG. 3 represents a tree corresponding to a particular complex filter.

The complex filter can be represented in the form of a tree, as shown in FIG. 3. The nodes of the tree that are not followed by another node are called the leaves. The tree of FIG. 3 includes three leaves: the leaf tcpConnRemPort=21; the leaf tcpConnState=established(5); the leaf tcpConnLocalPort•1024. The leaves represent conditions on attributes, while the other nodes represent boolean operations on one or more nodes.

In the present description, a complex request is a request transmitted by a manager 4, that involves SNMP attributes managed by an agent 5 and capable of being represented by a complex filter constituted by any number of conditions on any number of attributes, linked to one another by any number of operators such as AND, OR, NOT, EXCLUSIVE-OR, etc.

The SNMP protocol does not allow the SNMP agent 5 to respond to such complex requests, given the rudimentary commands that constitute the SNMP protocol, as seen above.

The method according to the present invention consists of processing said complex request by means of the agent integrator 6, which translates said complex request (of the CMIP type in the example illustrated) into SNMP requests, and of optimizing the number of SNMP requests transmitted through the network 3 particularly the number of GETNEXT requests.

According to the present invention, the method for processing a complex request addressed to at least one SNMP agent 5 of a resource machine 2*b* of the computer system 1 from a complex protocol manager 4 of an application machine 2*a*, each agent 5 managing attribute tables belonging to the resource machine 2*b*, the instances of the tables being referenced by identifiers comprising indexes, consists of:

transforming a complex filter F1 derived from the complex request into a simplified filter F2 comprising only conditions on indexes, the filter F2 corresponding to the following matching characteristics: the filter F2 lets through all the SNMP requests whose responses could verify the filter F1, but filters out all the SNMP requests whose responses cannot in any way verify the filter F1;

limiting the SNMP requests to those that comply with the filter F2, and applying the filter F1 to the responses.

The method according to the present invention comprises the following steps:

1—transforming a complex filter F1 derived from the complex request into a simplified filter F2 comprising only conditions on indexes and complying with the matching characteristics;

2—determining the first potential instance that verifies the conditions of the simplified filter F2; the identifier that is just below the identifier of the potential instance determined is called the test identifier;

3—finding, using an SNMP request, the instance of the table having as its identifier the one that follows the test identifier. If no instance is found, the processing method is terminated. If an instance is found, the instance found is called the solution instance;

4—applying the complex filter F1 to the solution instance; if the instance verifies the filter F1, it is part of the response to the complex request processed;

5—determining the first potential instance whose identifier is higher than the identifier of the solution instance and that verifies the conditions of the simplified filter F2. If no instance is found; the processing method is terminated. If an instance is found, the identifier that is just below the identifier of the potential instance is called the test identifier and the method resumes with the third step.

The first step consists of constructing, from a filter F1 derived from a given complex request, of the CMIP type in the example illustrated, a simplified filter F2 that comprises only conditions related to indexes.

The simplified filter F2 complies with the following characteristics, known as matching characteristics:

if there can exist attribute values such that a given instance of the table verifies the filter F1, then this instance verifies the filter F2;

if an instance of the table cannot verify the filter F1 no matter which of the attribute values are not indexes, then this instance does not verify the filter F2.

If no instance immediately verifies the complex filter F2, the agent integrator 6 transmits an empty response to the complex request transmitted by the manager 4. In one embodiment, said verification is performed in the following way: the agent integrator 6 has a list of rules defining the filters that are not immediately verified by any instance, such as for example:

"If a filter affects an attribute value V of the type "V=a AND V>b" and if "a b", then the filter has no response." This is the case, for example, when V represents a remote port number a=22 and b=41.

Another embodiment will be described below.

The agent integrator 6 can also have a list of transformation rules, such as for example:

(V a) AND (V a) corresponds to V=a;

(V a) AND (V different from a) corresponds to V>a;

(V a) OR (V<a) corresponds to TRUE (condition always fulfilled).

Beginning with any complex filter F1, the method consists of obtaining, by means of the agent integrator 6, a simplified filter F2 with the following form:

(OR
    (AND
        condition on the $1^{st}$ index
        condition on the $2^{nd}$ index
        ...
        condition on the $n^{th}$ index
    )
    (AND
        condition on the $1^{st}$ index
        condition on the $2^{nd}$ index
        ...
        condition on the $n^{th}$ index
    )
    ...
    )

If the complex filter contains operators other than ANDs, ORs and NOTs, the method according to the invention transforms said operators into combinations of AND, OR, and NOT using known rules on the logical operators.

For example, for the binary operators EXCLUSIVE-OR and IMPLIES:

(EXCLUSIVE-OR A B) is equivalent to (OR (AND A (NOT B)) (AND B (NOT A)));

(IMPLIES A B) is equivalent to (OR (NOT A) B).

The method then consists of pushing all the NOT operators to the leaves of the tree representing the filter by applying the following rules as many times as it is possible to do so:

replace (NOT (OR A B C . . . )) with (AND (NOT A) (NOT B) (NOT C) . . . );

replace (NOT (AND A B C . . . )) with (OR (NOT A) (NOT B) (NOT C) . . . );

replace (NOT (NOT A)) with A.

The next step consists of deleting from the filter all the conditions affecting attributes that are not indexes. It should be noted that, if X is a condition affecting an attribute that is not in index, then there can exist values of the attribute for which X is true, and others for which (NOT X) is true: all of the (NOT X)s pushed to the leaves in the preceding step are replaced by the constant TRUE, after which all the remaining Xs are replaced by the constant TRUE.

This step makes it possible to maintain the matching characteristics.

The filter is further simplified by applying the following rules as many times as it is possible to do so:

Replace all the AND operations containing only TRUE operands with the constant TRUE.

For example, replace (AND TRUE TRUE TRUE) with TRUE.

Remove all the TRUE operands from the other AND operations.

For example, replace (AND A B TRUE C TRUE) with (AND A B C).

Replace all the OR operations containing at least one TRUE operand with the constant TRUE.

For example, replace (OR A B TRUE C TRUE) with TRUE.

Replace the AND and OR operations having only one operand with this operand.

For example, replace (AND A) with A.

Factor the nested ANDs and ORs.

For example, replace (OR A (OR B C) D) with (OR A B C D).

Gather the conditions that relate to the same index. In the following description, simple or complex conditions, respectively relating to index number $1, 2, 3, \ldots n$ will be called C1, C2, C3 . . . Cn. Likewise, any condition related to any index k between 1 and n will be called Ck.

A condition such as (OR (AND Ck Ck) Ck (NOT Ck)) is replaced by a single condition of the Ck type that is a little more complex. This type of transformation specifically has the effect of deleting all the NOT operators.

When a condition of the Ck type is always true were always false, replace this condition with the value TRUE or FALSE, respectively.

In one embodiment of the system 1, the agent integrator 6 has a list of rules, such as for example:

(index 3<22) AND (index 3>23) corresponds to a FALSE condition;

(index 3<22) OR (index 3>21) corresponds to a TRUE condition.

Replace all the OR operations containing only FALSE conditions with the constant FALSE.

For example, replace (OR FALSE FALSE FALSE) with FALSE.

Remove all the FALSE conditions from the other OR operations.

For example, replace (OR A B FALSE C FALSE) with (OR A B C).

Replace all the AND operations containing at least one FALSE condition with the constant FALSE.

For example, replace (AND A B FALSE C FALSE) with FALSE.

The rules are applied in this order or in a different order until no more of said rules are applicable.

The above rules make it possible to obtain a simplified filter belonging to one of the following three cases:

1) the filter is reduced to only the TRUE condition;
2) the filter is reduced to only the FALSE condition;
3) the filter contains only AND and OR operators, each comprising no more than one condition on each of the indexes, and none comprising the value TRUE or FALSE.

In the first case, no knowledge can be obtained a priori of the instances that will work: the table must be scanned in its entirety.

In the second case, no instance will work: the integrating agent 6 responds to the complex filter with an empty response.

In the third case, the method consists of gathering all the ORs at the root of the filter: any OR operator contained in an AND operator is expanded.

For example, (AND C3 (OR C1 C2) C6) becomes (OR (AND C3 C1 C6)(AND C3 C2 C6))

Some of the previous simplifications must again be applied, i.e.:

Replace the AND and OR operations having only one operand with this operand.

Factor the nested ANDs and ORs.

Gather the conditions related to the same index.

When a condition of the Ck type is always true or always false, replace this condition with the value TRUE or FALSE, respectively.

Replace all the AND operations containing at least one FALSE condition with the constant FALSE.

Replace all the AND operations containing only TRUE conditions with the constant TRUE.

Remove all the TRUE conditions from the other AND operations.

Replace all the OR operations containing at least one TRUE condition with the constant TRUE.

Replace all the OR operations containing only FALSE conditions with the constant FALSE.

Remove all the FALSE conditions from the other OR operations.

The rules are applied in this order or in a different order until no more of said rules are applicable.

The simplified filter obtained belongs to one of the following cases:

1) the filter is reduced to only the TRUE condition;
2) the filter is reduced to only the FALSE condition;
3) the filter is reduced to only one Ck condition;
4) the filter exists in the form of an AND between two or more Ck conditions;
5) the filter exists in the form of an OR between two or more filter is of type 3) or 4).

Except in cases 1) and 2) explained above, the simplified filter F2 has the following form (or a form simpler than the following form, which can easily be restored):

F2=(OR (AND $C1_{(1)}$ $C2_{(1)}$ ... $Cn_{(1)}$) ... (AND $C1_{(i)}$ $C2_{(i)}$ ... $Cn_{(i)}$) ... ).

The simplified filter F2 can be written in the following way:

F2=(OR $F2_{(1)}$ $F2_{(2)}$ ... $F2_{(i)}$ ... $F2_{(m)}$)

where each $F2_{(i)}$ has the following form:

$F2_{(i)}$=(AND $C1_{(i)}$ $C2_{(i)}$ ... $Cn_{(i)}$)

The second step consists of determining, by means of the agent integrator 6, the first instance, called a potential instance, that verifies the conditions of the simplified filter F2.

The first potential instance that verifies the filter F2 is the smallest of the so-called "local" first potential instances verifying each of the $F2_{(i)}$s: the method therefore consists of searching for the first instance that verifies a filter of the type (AND $C1_{(i)}$ $C2_{(i)}$ ... $Cn_{(i)}$). For any i, the identifier of the "local" first potential instance that verifies $F2_{(i)}$ is obtained by concatenating the first value $I1\_0_{(i)}$ verifying $C1_{(i)}$ with the first value $I2\_0_{(i)}$ verifying $C2_{(i)}$, etc., up to $In\_0_{(i)}$ verifying $C1_{(i)}$. The identifier of the local potential instance, called the "zero" local potential instance because the local potential instance obtained first at the start of the method, is $I1\_0_{(i)}$. $I2\_0_{(i)} \ldots I\_0_{(i)}$. If there is no condition on a given index k ($k^{th}$ index), the first possible value is used for this index: 0 for an integer, 0.0.0.0 for an IP address, etc. The identifier of the potential instance is the smallest of the zero local potential instance identifiers obtained.

It must be noted that the agent integrator 6 knows the values of the indexes (as seen above) but not the values of the attributes for which it must interrogate the agent 5 that manages the attribute in question.

For a given index i and for each index k, there exists at least one value $Ik\_0_{(i)}$ that verifies the condition $Ck_{(i)}$, otherwise the condition $Ck_{(i)}$ would have been deleted at the end of the first step. The other embodiment of the system mentioned above, which allows the agent integrator to detect the filters for which no response is possible, is the following: wait for the $2^{nd}$ step to delete them, and in the $2^{nd}$ step, if there exists a condition Ck for which no value is found, the condition Ck is one of the conditions for which no response is possible.

The identifier just below the identifier of the potential instance is called the test identifier. It is obtained in the following way:

If the last number of the identifier of the potential instance is different from 0, the test identifier is identical to the identifier of the potential instance except for the last number, which is just below the last number of the identifier of the potential instance.

For example:

195.3.27.2 (identifier of the potential instance)→ 195.3.27.1 (test identifier)

If the last number of the identifier of the potential instance is equal to 0, the test identifier corresponds to the identifier of the potential instance without its last number.

For example:

195.3.27.0 (identifier of the potential instance)→195.3.27 (test identifier).

The agent integrator 6, in the third step, applies the request GETNEXT to the test identifier.

If the response to the GETNEXT indicates that the end of the table has been reached, the agent integrator 6 responds to the complex request within the information that there are no further responses. The operation is terminated: this constitutes the first case of termination.

If an instance is obtained, it is called the solution instance. If Ik designates the value of each of the indexes k of the solution instance, the identifier of the solution instance, called the solution identifier, is I1.I2 . . . In In a fourth step, the agent integrator 6 applies the complex filter F1 to said solution instance. If the response is appropriate, it is returned in response to the complex request. The method continues the operation whether the response is appropriate or not.

In the fifth step, the method determines by means of the agent integrator 6 the first potential instance whose identifier is strictly higher than the solution identifier and that verifies the simplified filter F2. This first potential instance is the smallest of the local first potential instances for each filter $F2_{(i)}$ whose identifier is strictly higher than the solution identifier and that verifies the filter $F2_{(i)}$.

I1.I2 . . . In is the solution identifier, as seen above.

The following operations are performed for each $F2_{(i)}$:

Let p be the first index such that Ip does not verify the condition $Cp_{(i)}$.

If such an index p does not exist, (i.e. if the instance completely verifies the filter), then we take p=n.

The method executes the following loop as long as the index p>0 and no instance has been found:

{ If there exists a $Jp_{(i)}>Ip$ that verifies the condition $CP_{(i)}$, then the identifier of the local potential instance is formed in the following way:
  for any index k<p, we take the value Ik;
  for the index p, we take the value $Jp_{(i)}$;
  for any index k>p, we take the value $Ik\_0_{(i)}$; and the method exits the loop;
Otherwise p::=p−1 and the method continues to loop with the new value of p;
}

It will be recalled that the value $Ik\_0_{(i)}$ corresponds to the zero local potential instance identifier at the start of the method ($I1\_0_{(i)}.I2\_0_{(i)} \ldots In\_0_{(i)}$) (see above).

If p=0, then there is no other instance that verifies this set of conditions for $F2_{(i)}$.

If no local potential instance is obtained (i.e. if the method exits the loop with p=0 for each $F2_{(i)}$), then there is no other instance that verifies the simplified filter F2; the agent integrator 6 indicates in a response to the complex request from the manager 4 that there are no further responses. The operation is terminated: this constitutes the second case of termination.

If at least one local potential instance is obtained, the identifier of the potential instance is the smallest of the local potential instance identifiers obtained. The identifier that is just below the identifier of the potential instance is called the test identifier. The method resumes with the third step. The agent integrator 6 applies a GETNEXT to the test identifier and so on. The third, fourth and fifth steps are applied until the operation ends in one of the two cases of termination presented above.

The method according to the invention is described through the following detailed example. The values of the connection table are given in Annex 1.

The complex filter F1 is the following:
(AND
tcpConnState EQUAL_TO 5
(OR
  tcpConnLocalPort EQUAL_TO 21
  tcpConnLocalPort EQUAL_TO 23
)
(NOT
  tcpConnRemAddress EQUAL_TO 127.0.0.1
)
tcpConnRemPort GREATER_THAN_OR_EQUAL_TO 1024
)

The first step is automatic in this example. The condition on the attribute tcpConnState is set to the value TRUE and because of this, the simplified filter F2 has the following form:
$F2=(OR\ F2_{(1)})=F2_{(1)}=(AND\ C1_{(1)}\ C2_{(1)}\ C3_{(1)}\ C4_{(1)})$ with:
$C1_{(1)}$: no constraint on the first index
$C2_{(1)}$: second index EQUAL_TO 21 or 23
$C3_{(1)}$: third index DIFFERENT_FROM 127.0.0.1
$C4_{(1)}$: fourth index GREATER_THAN_OR_EQUAL_TO 1024

The second step consists of searching for the zero local potential instance, i.e. the first possible values for each of the conditions. The first possible values are:
$I1\_0_{(i)}$=0.0.0.0
$I2\_0_{(i)}$=21
$I3\_0_{(i)}$=0.0.0.0
$I4\_0_{(i)}$=1024.

The identifier of the zero local potential instance is obtained by concatenating the first value that verifies $C1_{(i)}$ with the first value that verifies $C2_{(1)}$, with the first value that verifies $C3_{(1)}$ and with the first value that verifies $C4_{(1)}$: $I1\_0_{(1)}.I2\_0_{(1)}.I3\_0_{(1)}.I4\_0_{(1)}$, or 0.0.0.0.21.0.0.0.0.1024. Since there exists only one $F2_{(i)}$, i.e. $F2_{(1)}$, the identifier obtained is the smallest one and corresponds to the identifier of the potential instance. The test identifier is therefore 0.0.0.0.21.0.0.0.0.1023.

The third step consists of applying the first GETNEXT request to this test identifier. The result obtained (solution identifier I1.I2.I3.I4) is 0.0.0.0.23.0.0.0.0.0.

In a fourth step, the filter F1 is applied to said result, i.e. to the solution identifier. The filter F1 fails on this instance (I4<1024 and tcpConnState equal to 2 different from 5).

In a fifth step, the first local potential instance whose identifier is strictly greater than the solution identifier (the identifier of the solution instance) is calculated. Let p be the first index such that Ip does not verify the condition $Cp_{(1)}$.

It is not p+1 because there is no constraint on I1;
It is not p=2 because I2=23 verifies $C2_{(1)}$;
It is not p=3 because I3=0.0.0.0 verifies $C3_{(1)}$;
It is p=4 because I4=0 does not verify $C4_{(1)}$.

The method re-enters the calculation loop (the method stays in the loop as long as p>0 and no instance has been found):

p=4: does there exist a $J4_{(1)}$ greater than I4=0 that verifies $C4_{(1)}$? Yes: $J4_{(1)}=1024$ The new identifier of the potential instance is therefore $I1.I2.I3.J4_{(1)}$, or 0.0.0.0.23.0.0.0.0.1024. The new test identifier is therefore 0.0.0.0.23.0.0.0.0.1023. The method resumes with the third step: the result of the second GETNEXT request on this test identifier gives 0.0.0.0.25.0.0.0.0.0 (solution identifier I1.I2.I3.I4.). The filter F1 fails on this instance (I4<1024, 12 different from 21 or 23 and tcpConnState equal to 2 different from 5).

The method continues by calculating the local first potential instance whose identifier is strictly higher than the solution identifier (identifier of the solution instance). Let p be the first index such that Ip does not verify the condition $Cp_{(1)}$.

It is not p=1 because there is no constraint on I1;
It is p=2 because I2=25 does not verify $C2_{(1)}$.

The method re-enters the calculation loop (the method remains in the loop as long as p>0 and no instance has been found):

p=2: does there exist a $J2_{(1)}$ higher than I2=25 that verifies $C2_{(1)}$? No.

p=1: does there exist a $J1_{(1)}$ higher than I1=0.0.0.0? Yes: $J1_{(1)}=0.0.0.1$ The new identifier of the potential instance is therefore $J1_{(1)}.I2\_0_{(1)}.I3\_0_{(1)}.I4\_0_{(1)}$, or 0.0.0.1.21.0.0.0.0.1024 (it will be recalled that the identifier of the zero local potential instance at the start of the method, $I1\_0_{(1)}.I2\_0_{(1)}.I3\_0_{(1)}.I4\_0_{(1)}$, is equal to 0.0.0.0.21.0.0.0.0.1024). The new test identifier is therefore 0.0.0.1.21.0.0.0.0.1023. The result of the third GETNEXT on this test identifier gives 127.0.0.1.1026.127.0.0.1.2600 (solution identifier I1.I2.I3.I4). The filter F1 fails on this solution identifier (I2 different from 21 or 23).

The method continues by calculating the local first potential instance whose identifier is strictly higher than the solution identifier. Let p be the first index such that Ip does not verify the condition $Cp_{(1)}$.

It is not p=1 because there is no constraint on I1;
It is p=2 because I2=1026 does not verify $C2_{(1)}$.

The method re-enters the calculation loop (the method remains in the loop as long as p>0 and no instance has been found):

p=2: is there $J2_{(1)}$ higher than I2=1026 that verifies $C2_{(1)}$? No.

p=1: is there $J1_{(1)}$ higher than I1=127.0.0.1? higher than I1=127.0.0.1? Yes: $J1_{(1)}=127.0.0.2$ The new identifier of the potential instance is therefore $J1_{(1)}.I2\_0_{(1)}.I3\_0_{(1)}.I4\_0_{(1)}$, or 127.0.0.2.21.0.0.0.0.1024. The new test identifier is therefore 127.0.0.2.21.0.0.0.0.1023. The result of the fourth GETNEXT on this test identifier gives 219.182.165.53.23.219.182.165.55.4109 (solution identifier I1.I2.I3.I4). The filter F1 succeeds on this solution identifier; a response is therefore sent to the complex request.

The method continues by calculating the local first potential instance whose identifier is strictly higher than the solution identifier. Let p be the first index such that Ip does not verify the condition $Cp_{(1)}$.

It is not p=1 because there is no constraint on I1;
It is not p=2 because I2=23 verifies $C2_{(1)}$;
It is not p=3 because I3=219.182.165.55 verifies $C3_{(1)}$;
It is not p=4 because I4=4109 verifies $C4_{(1)}$.

Since no such p exists, we take p=n=4.

The method re-enters the calculation loop (the method remains in the loop as long as p>0 and no instance has been found):

p=4: does there exist a $J4_{(1)}$ higher than I4=4109 that verifies $C4_{(1)}$? Yes: $J4_{(1)}=4110$ The new identifier of the potential instance is therefore $I1.I2.I3.J4_{(1)}$, or 219.182.165.53.23.219.182.165.55.4110. The new test identifier is therefore 219.182.165.53.23.219.182.165.55.4109. The result of the fifth GETNEXT on this test identifier gives 219.182.165.53.139.219.182.165.58.2278 (solution identifier I1.I2.I3.I4). The filter F1 fails on this solution identifier.

The method continues by calculating the local first potential instance whose identifier is strictly higher than the solution identifier. Let p be the first index such that Ip does not verify the condition $Cp_{(1)}$.

It is not p=1 because there is no constraint on I1;
It is p=2 because I2=139 does not verify $C2_{(1)}$.

The method re-enters the calculation loop (the method remains in the loop as long as p>0 and no instance has been found):

p=2: does there exist a $J2_{(1)}$ higher than I2=139 that verifies $C2_{(1)}$? No.

p=1: does there exist a $J1_{(1)}$ higher than I1=219.182.165.53? Yes: $J1_{(1)}=219.182.165.54$ The new identifier of the potential instance is therefore $J1_{(1)}.I2\_0_{(1)}.I3\_0_{(1)}.I4\_0_{(1)}$, or 219.182.165.54.21.0.0.0.0.1024. The new test identifier is therefore 219.182.165.54.21.0.0.0.0.1023. The result of the sixth GETNEXT on this test identifier indicates that there are no further instances. It is then possible to respond to the complex request with the information that the search is finished.

It must be noted that according to the prior art, it would take 42 GETNEXT requests to scan the 41 instances of the table, (it requires an additional GETNEXT request to detect the end of the table), whereas according to the invention, 6 GETNEXT requests are enough.

The present invention relates to a method for processing a complex request addressed to at least one SNMP agent 5 of the resource machine 2b of the computer system 1 from the complex protocol manager 4 of the application machine 2a, each agent 5 managing attribute tables belonging to the resource machine 2b, the instances of the tables been referenced by identifiers comprising indexes, characterized in that it consists of:

transforming a filter F1 derived from the complex request into a simplified filter F2 comprising only conditions on indexes, the filter F2 corresponding to the corresponding matching characteristics: the filter F2 lets through all the SNMP requests whose responses could verify the filter F1, but filters out all the SNMP requests whose responses cannot in any way verify the filter F1;

limiting the SNMP requests to those that comply with the filter F2, and applying the filter F1 to the responses.

The method consists of:
1) transforming the filter F1 derived from the complex request into a simplified filter F2 comprising only conditions on indexes and complying with the matching characteristics;
2) determining the first potential instance that verifies the simplified filter F2; the identifier that is just below the identifier of the potential instance determined is called the test identifier;
3) finding, using an SNMP request, the instance of the table having as its identifier the one that follows the test identifier. If no instance is found, the processing method is terminated. If an instance is found, the instance found is called the solution instance;
4) applying the complex filter F1 to the solution instance; if the instance verifies the filter F1, it is part of the response to the complex request processed;
5) determining the first potential instance whose identifier is higher than the identifier of the solution instance and that verifies the simplified filter F2. If no instance is found, the processing method is terminated. If an instance is found, the identifier that is just below the identifier of the potential instance is called the test identifier, and the method resumes with the third step.

The method consists of obtaining, in the first step, a simplified filter with the form:

(OR
(AND
  condition on index 1: $C1_{(1)}$
  condition on index 2: $C2_{(1)}$
  ...
  condition on index n: $Cn_{(1)}$
)
...
(AND
  condition on index 1: $C1_{(i)}$
  condition on index 2: $C2_{(i)}$
  ...
  condition on index n: $Cn_{(i)}$
)
...
).

If, in the first step, after simplification, the filter is reduced to:

only the TRUE condition, the table is scanned in its entirety;

only the FALSE condition, no instance can work.

In order to obtain the simplified filter F2, the method consists of immediately verifying whether the complex filter corresponds to rules defining filters that are not verified by any instance.

In order to obtain a simplified filter F2, the method consists of:

transforming the complex filter into a combination of conditions on the attributes joined by the logical operators AND, OR and NOT;

pushing the NOT operators to the leaves and deleting the double NOTs (NOT NOT);

deleting the conditions X related to attributes that are not indexes;

simplifying the resulting operations;

factoring the nested ANDs and ORs;

gathering the conditions related to the same index;

gathering all the ORs at the route of the filter and simplifying again.

In order to delete the conditions X, the method consists of replacing the conditions X and NOT X with the constant TRUE.

In order to simplify the operations, the method consists of:

replacing the AND and OR tests having only one operand with this operand;

replacing the AND operations containing only TRUE operands with the constant TRUE and the OR operations containing only FALSE operands with the constant FALSE;

removing the TRUE conditions from the other AND operations and the FALSE conditions from the other OR operations;

replacing the OR operations containing at least one TRUE operand with the constant TRUE and the AND operations containing at least one FALSE operand with the constant FALSE;

replacing the conditions that are always TRUE or FALSE with the constant TRUE or FALSE;

all of these simplification operations being applied as many times as it is possible to do so.

In the second step, the method consists of concatenating the first value that verifies $C1_{(i)}$ with the first value that verifies $C2_{(i)}$ and so on up to $Cn_{(i)}$, in order to obtain the zero local potential instances $I1\_0_{(i)}.I2\_0_{(i)} \ldots In\_0_{(i)}$, the first possible value without a condition on a given index being the null value, the potential instance corresponding to the smallest of the zero local potential instances.

In the fifth step, the method consists of performing, for any i and as long as the index p is greater than 0 or no instance searched for is found, the following operations:

If there exists a $Jp_{(i)} > Ip$ that verifies the condition $CP_{(i)}$, then the local potential instance is formed in the following way:

for any index k<p, we take the value Ik with I1.I2 ... In being the identifier of the solution instance;

for the index p, we take the value $Jp_{(i)}$;

for any index k>p, we take the value $Ik\_0_{(i)}$;

Otherwise, p takes the value p−1 and the method repeats the above operations, the potential instance corresponding to the smallest of the local potential instances obtained.

In the second and fifth steps, the method consists of obtaining the test identifier from the identifier of the potential instance, by subtracting 1 from its last number if the latter is different from zero, or by deleting this last number if it is null.

The method also relates to the system for processing the complex request addressed to at least one SNMP agent 5 of the resource machine 2b of the computer system 1 from a complex protocol manager 4 of the application machine 2a, each agent 5 managing attribute tables belonging to the resource machine 2b, the instances of the tables being referenced by identifiers comprising indexes, the system comprising the agent integrator 6 that makes it possible to implement the processing method described above.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claims.

ANNEX 1

Exemplary values of the connection table:

tcpConnState.0.0.0.0.0.0.0.0.0.0 = 1.
tcpConnState.0.0.0.0.7.0.0.0.0.0 = 2
tcpConnState.0.0.0.0.9.0.0.0.0.0 = 2
tcpConnState.0.0.0.0.13.0.0.0.0.0 = 2
tcpConnState.0.0.0.0.19.0.0.0.0.0 = 2
tcpConnState.0.0.0.0.21.0.0.0.0.0 = 2
tcpConnState.0.0.0.0.23.0.0.0.0.0 = 2
tcpConnState.0.0.0.0.25.0.0.0.0.0 = 2
tcpConnState.0.0.0.0.37.0.0.0.0.0 = 2
tcpConnState.0.0.0.0.80.0.0.0.0.0 = 2
tcpConnState.0.0.0.0.111.0.0.0.0.0 = 2
tcpConnState.0.0.0.0.139.0.0.0.0.0 = 2
tcpConnState.0.0.0.0.199.0.0.0.0.0 = 2
tcpConnState.0.0.0.0.512.0.0.0.0.0 = 2
tcpConnState.0.0.0.0.513.0.0.0.0.0 = 2
tcpConnState.0.0.0.0.514.0.0.0.0.0 = 2
tcpConnState.0.0.0.0.540.0.0.0.0.0 = 2
tcpConnState.0.0.0.0.659.0.0.0.0.0 = 2
tcpConnState.0.0.0.0.757.0.0.0.0.0 = 2
tcpConnState.0.0.0.0.779.0.0.0.0.0 = 2
tcpConnState.0.0.0.0.790.0.0.0.0.0 = 2
tcpConnState.0.0.0.0.793.0.0.0.0.0 = 2
tcpConnState.0.0.0.0.919.0.0.0.0.0 = 2
tcpConnState.0.0.0.0.924.0.0.0.0.0 = 2
tcpConnState.0.0.0.0.1024.0.0.0.0.0 = 2
tcpConnState.0.0.0.0.1025.0.0.0.0.0 = 2
tcpConnState.0.0.0.0.2401.0.0.0.0.0 = 2
tcpConnState.0.0.0.0.2600.0.0.0.0.0 = 2
tcpConnState.0.0.0.0.6000.0.0.0.0.0 = 2
tcpConnState.127.0.0.1.1026.127.0.0.1.2600 = 5
tcpConnState.127.0.0.1.2600.127.0.0.1.1026 = 5
tcpConnState.219.182.165.53.23.219.182.165.55.4109 = 5
tcpConnState.219.182.165.53.139.219.182.165.58.2278 = 5
tcpConnState.219.182.165.53.1017.219.182.100.2.1018 = 5
tcpConnState.219.182.165.53.1018.219.182.100.2.514 = 7
tcpConnState.219.182.165.53.1020.219.182.165.55.513 = 5
tcpConnState.219.182.165.53.1021.219.182.165.55.513 = 5
tcpConnState.219.182.165.53.1022.219.182.100.2.1019 = 5
tcpConnState.219.182.165.53.1023.219.182.100.2.514 = 7
tcpConnState.219.182.165.53.1905.219.182.165.55.21 = 8
tcpConnState.219.182.165.53.6000.219.182.100.2.1304 = 5
tcpConnLocalAddress.0.0.0.0.0.0.0.0.0.0 = 0.0.0.0
tcpConnLocalAddress.0.0.0.0.7.0.0.0.0.0 = 0.0.0.0
tcpConnLocalAddress.0.0.0.0.9.0.0.0.0.0 = 0.0.0.0
tcpConnLocalAddress.0.0.0.0.13.0.0.0.0.0 = 0.0.0.0
tcpConnLocalAddress.0.0.0.0.19.0.0.0.0.0 = 0.0.0.0
tcpConnLocalAddress.0.0.0.0.21.0.0.0.0.0 = 0.0.0.0
tcpConnLocalAddress.0.0.0.0.23.0.0.0.0.0 = 0.0.0.0
tcpConnLocalAddress.0.0.0.0.25.0.0.0.0.0 = 0.0.0.0
tcpConnLocalAddress.0.0.0.0.37.0.0.0.0.0 = 0.0.0.0
tcpConnLocalAddress.0.0.0.0.80.0.0.0.0.0 = 0.0.0.0
tcpConnLocalAddress.0.0.0.0.111.0.0.0.0.0 = 0.0.0.0
tcpConnLocalAddress.0.0.0.0.139.0.0.0.0.0 = 0.0.0.0
tcpConnLocalAddress.0.0.0.0.199.0.0.0.0.0 = 0.0.0.0
tcpConnLocalAddress.0.0.0.0.512.0.0.0.0.0 = 0.0.0.0
tcpConnLocalAddress.0.0.0.0.513.0.0.0.0.0 = 0.0.0.0
tcpConnLocalAddress.0.0.0.0.514.0.0.0.0.0 = 0.0.0.0
tcpConnLocalAddress.0.0.0.0.540.0.0.0.0.0 = 0.0.0.0
tcpConnLocalAddress.0.0.0.0.659.0.0.0.0.0 = 0.0.0.0
tcpConnLocalAddress.0.0.0.0.757.0.0.0.0.0 = 0.0.0.0
tcpConnLocalAddress.0.0.0.0.779.0.0.0.0.0 = 0.0.0.0
tcpConnLocalAddress.0.0.0.0.790.0.0.0.0.0 = 0.0.0.0
tcpConnLocalAddress.0.0.0.0.793.0.0.0.0.0 = 0.0.0.0

ANNEX 1-continued

Exemplary values of the connection table:

tcpConnLocalAddress.0.0.0.0.919.0.0.0.0.0 = 0.0.0.0
tcpConnLocalAddress.0.0.0.0.924.0.0.0.0.0 = 0.0.0.0
tcpConnLocalAddress.0.0.0.0.1024.0.0.0.0.0 = 0.0.0.0
tcpConnLocalAddress.0.0.0.0.1025.0.0.0.0.0 = 0.0.0.0
tcpConnLocalAddress.0.0.0.0.2401.0.0.0.0.0 = 0.0.0.0
tcpConnLocalAddress.0.0.0.0.2600.0.0.0.0.0 = 0.0.0.0
tcpConnLocalAddress.0.0.0.0.6000.0.0.0.0.0 = 0.0.0.0
tcpConnLocalAddress.127.0.0.1.1026.127.0.0.1.2600 = 127.0.0.1
tcpConnLocalAddress.127.0.0.1.2600.127.0.0.1.1026 = 127.0.0.1
tcpConnLocalAddress.219.182.165.53.23.219.182.165.55.4109 = 219.182.165.53
tcpConnLocalAddress.219.182.165.53.139.219.182.165.58.2278 = 219.182.165.53
tcpConnLocalAddress.219.182.165.53.1017.219.182.100.2.1018 = 219.182.165.53
tcpConnLocalAddress.219.182.165.53.1018.219.182.100.2.514 = 219.182.165.53
tcpConnLocalAddress.219.182.165.53.1020.219.182.165.55.513 = 219.182.165.53
tcpConnLocalAddress.219.182.165.53.1021.219.182.165.55.513 = 219.182.165.53
tcpConnLocalAddress.219.182.165.53.1022.219.182.100.2.1019 = 219.182.165.53
tcpConnLocalAddress.219.182.165.53.1023.219.182.100.2.514 = 219.182.165.53
tcpConnLocalAddress.219.182.165.53.1905.219.182.165.55.21 = 219.182.165.53
tcpConnLocalAddress.219.182.165.53.6000.219.182.100.2.1304 = 219.182.165.53
tcpConnLocalPort.0.0.0.0.0.0.0.0.0.0 = 0
tcpConnLocalPort.0.0.0.0.7.0.0.0.0.0 = 7
tcpConnLocalPort.0.0.0.0.9.0.0.0.0.0 = 9
tcpConnLocalPort.0.0.0.0.13.0.0.0.0.0 = 13
tcpConnLocalPort.0.0.0.0.19.0.0.0.0.0 = 19
tcpConnLocalPort.0.0.0.0.21.0.0.0.0.0 = 21
tcpConnLocalPort.0.0.0.0.23.0.0.0.0.0 = 23
tcpConnLocalPort.0.0.0.0.25.0.0.0.0.0 = 25
tcpConnLocalPort.0.0.0.0.37.0.0.0.0.0 = 37
tcpConnLocalPort.0.0.0.0.80.0.0.0.0.0 = 80
tcpConnLocalPort.0.0.0.0.111.0.0.0.0.0 = 111
tcpConnLocalPort.0.0.0.0.139.0.0.0.0.0 = 139
tcpConnLocalPort.0.0.0.0.199.0.0.0.0.0 = 199
tcpConnLocalPort.0.0.0.0.512.0.0.0.0.0 = 512
tcpConnLocalPort.0.0.0.0.513.0.0.0.0.0 = 513
tcpConnLocalPort.0.0.0.0.514.0.0.0.0.0 = 514
tcpConnLocalPort.0.0.0.0.540.0.0.0.0.0 = 540
tcpConnLocalPort.0.0.0.0.659.0.0.0.0.0 = 659
tcpConnLocalPort.0.0.0.0.757.0.0.0.0.0 = 757
tcpConnLocalPort.0.0.0.0.779.0.0.0.0.0 = 779
tcpConnLocalPort.0.0.0.0.790.0.0.0.0.0 = 790
tcpConnLocalPort.0.0.0.0.793.0.0.0.0.0 = 793
tcpConnLocalPort.0.0.0.0.919.0.0.0.0.0 = 919
tcpConnLocalPort.0.0.0.0.924.0.0.0.0.0 = 924
tcpConnLocalPort.0.0.0.0.1024.0.0.0.0.0 = 1024
tcpConnLocalPort.0.0.0.0.1025.0.0.0.0.0 = 1025
tcpConnLocalPort.0.0.0.0.2401.0.0.0.0.0 = 2401
tcpConnLocalPort.0.0.0.0.2600.0.0.0.0.0 = 2600
tcpConnLocalPort.0.0.0.0.6000.0.0.0.0.0 = 6000
tcpConnLocalPort.127.0.0.1.1026.127.0.0.1.2600 = 1026
tcpConnLocalPort.127.0.0.1.2600.127.0.0.1.1026 = 2600
tcpConnLocalPort.219.182.165.53.23.219.182.165.55.4109 = 23
tcpConnLocalPort.219.182.165.53.139.219.182.165.58.2278 = 139
tcpConnLocalPort.219.182.165.53.1017.219.182.100.2.1018 = 1017
tcpConnLocalPort.219.182.165.53.1018.219.182.100.2.514 = 1018
tcpConnLocalPort.219.182.165.53.1020.219.182.165.55.513 = 1020
tcpConnLocalPort.219.182.165.53.1021.219.182.165.55.513 = 1021
tcpConnLocalPort.219.182.165.53.1022.219.182.100.2.1019 = 1022
tcpConnLocalPort.219.182.165.53.1023.219.182.100.2.514 = 1023
tcpConnLocalPort.219.182.165.53.1905.219.182.165.55.21 = 1905
tcpConnLocalPort.219.182.165.53.6000.219.182.100.2.1304 = 6000
tcpConnRemAddress.0.0.0.0.0.0.0.0.0.0 = 0.0.0.0
tcpConnRemAddress.0.0.0.0.7.0.0.0.0.0 = 0.0.0.0
tcpConnRemAddress.0.0.0.0.9.0.0.0.0.0 = 0.0.0.0
tcpConnRemAddress.0.0.0.0.13.0.0.0.0.0 = 0.0.0.0
tcpConnRemAddress.0.0.0.0.19.0.0.0.0.0 = 0.0.0.0
tcpConnRemAddress.0.0.0.0.21.0.0.0.0.0 = 0.0.0.0
tcpConnRemAddress.0.0.0.0.23.0.0.0.0.0 = 0.0.0.0

ANNEX 1-continued

Exemplary values of the connection table:

tcpConnRemAddress.0.0.0.0.25.0.0.0.0.0 = 0.0.0.0
tcpConnRemAddress.0.0.0.0.37.0.0.0.0.0 = 0.0.0.0
tcpConnRemAddress.0.0.0.0.80.0.0.0.0.0 = 0.0.0.0
tcpConnRemAddress.0.0.0.0.111.0.0.0.0.0 = 0.0.0.0
tcpConnRemAddress.0.0.0.0.139.0.0.0.0.0 = 0.0.0.0
tcpConnRemAddress.0.0.0.0.199.0.0.0.0.0 = 0.0.0.0
tcpConnRemAddress.0.0.0.0.512.0.0.0.0.0 = 0.0.0.0
tcpConnRemAddress.0.0.0.0.513.0.0.0.0.0 = 0.0.0.0
tcpConnRemAddress.0.0.0.0.514.0.0.0.0.0 = 0.0.0.0
tcpConnRemAddress.0.0.0.0.540.0.0.0.0.0 = 0.0.0.0
tcpConnRemAddress.0.0.0.0.659.0.0.0.0.0 = 0.0.0.0
tcpConnRemAddress.0.0.0.0.757.0.0.0.0.0 = 0.0.0.0
tcpConnRemAddress.0.0.0.0.779.0.0.0.0.0 = 0.0.0.0
tcpConnRemAddress.0.0.0.0.790.0.0.0.0.0 = 0.0.0.0
tcpConnRemAddress.0.0.0.0.793.0.0.0.0.0 = 0.0.0.0
tcpConnRemAddress.0.0.0.0.919.0.0.0.0.0 = 0.0.0.0
tcpConnRemAddress.0.0.0.0.924.0.0.0.0.0 = 0.0.0.0
tcpConnRemAddress.0.0.0.0.1024.0.0.0.0.0 = 0.0.0.0
tcpConnRemAddress.0.0.0.0.1025.0.0.0.0.0 = 0.0.0.0
tcpConnRemAddress.0.0.0.0.2401.0.0.0.0.0 = 0.0.0.0
tcpConnRemAddress.0.0.0.0.2600.0.0.0.0.0 = 0.0.0.0
tcpConnRemAddress.0.0.0.0.6000.0.0.0.0.0 = 0.0.0.0
tcpConnRemAddress.127.0.0.1.1026.127.0.0.1.2600 = 127.0.0.1
tcpConnRemAddress.127.0.0.1.2600.127.0.0.1.1026 = 127.0.0.1
tcpConnRemAddress.219.182.165.53.23.219.182.165.55.4109 = 219.182.165.55
tcpConnRemAddress.219.182.165.53.139.219.182.165.58.2278 = 219.182.165.58
tcpConnRemAddress.219.182.165.53.1017.219.182.100.2.1018 = 219.182.100.2
tcpConnRemAddress.219.182.165.53.1018.219.182.100.2.514 = 219.182.100.2
tcpConnRemAddress.219.182.165.53.1020.219.182.165.55.513 = 219.182.165.55
tcpConnRemAddress.219.182.165.53.1021.219.182.165.55.513 = 219.182.165.55
tcpConnRemAddress.219.182.165.53.1022.219.182.100.2.1019 = 219.182.100.2
tcpConnRemAddress.219.182.165.53.1023.219.182.100.2.514 = 219.182.100.2
tcpConnRemAddress.219.182.165.53.1905.219.182.165.55.21 = 219.182.165.55
tcpConnRemAddress.219.182.165.53.6000.219.182.100.2.1304 = 219.182.100.2
tcpConnRemPort.0.0.0.0.0.0.0.0.0.0 = 0
tcpConnRemPort.0.0.0.0.7.0.0.0.0.0 = 0
tcpConnRemPort.0.0.0.0.9.0.0.0.0.0 = 0
tcpConnRemPort.0.0.0.0.13.0.0.0.0.0 = 0
tcpConnRemPort.0.0.0.0.19.0.0.0.0.0 = 0
tcpConnRemPort.0.0.0.0.21.0.0.0.0.0 = 0
tcpConnRemPort.0.0.0.0.23.0.0.0.0.0 = 0
tcpConnRemPort.0.0.0.0.25.0.0.0.0.0 = 0
tcpConnRemPort.0.0.0.0.37.0.0.0.0.0 = 0
tcpConnRemPort.0.0.0.0.80.0.0.0.0.0 = 0
tcpConnRemPort.0.0.0.0.111.0.0.0.0.0 = 0
tcpConnRemPort.0.0.0.0.139.0.0.0.0.0 = 0
tcpConnRemPort.0.0.0.0.199.0.0.0.0.0 = 0
tcpConnRemPort.0.0.0.0.512.0.0.0.0.0 = 0
tcpConnRemPort.0.0.0.0.513.0.0.0.0.0 = 0
tcpConnRemPort.0.0.0.0.514.0.0.0.0.0 = 0
tcpConnRemPort.0.0.0.0.540.0.0.0.0.0 = 0
tcpConnRemPort.0.0.0.0.659.0.0.0.0.0 = 0
tcpConnRemPort.0.0.0.0.757.0.0.0.0.0 = 0
tcpConnRemPort.0.0.0.0.779.0.0.0.0.0 = 0
tcpConnRemPort.0.0.0.0.790.0.0.0.0.0 = 0
tcpConnRemPort.0.0.0.0.793.0.0.0.0.0 = 0
tcpConnRemPort.0.0.0.0.919.0.0.0.0.0 = 0
tcpConnRemPort.0.0.0.0.924.0.0.0.0.0 = 0
tcpConnRemPort.0.0.0.0.1024.0.0.0.0.0 = 0
tcpConnRemPort.0.0.0.0.1025.0.0.0.0.0 = 0
tcpConnRemPort.0.0.0.0.2401.0.0.0.0.0 = 0
tcpConnRemPort.0.0.0.0.2600.0.0.0.0.0 = 0
tcpConnRemPort.0.0.0.0.6000.0.0.0.0.0 = 0
tcpConnRemPort.127.0.0.1.1026.127.0.0.1.2600 = 2600
tcpConnRemPort.127.0.0.1.2600.127.0.0.1.1026 = 1026
tcpConnRemPort.219.182.165.53.23.219.182.165.55.4109 = 4109
tcpConnRemPort.219.182.165.53.139.219.182.165.58.2278 = 2278

ANNEX 1-continued

Exemplary values of the connection table:

tcpConnRemPort.219.182.165.53.1017.219.182.100.2.1018 = 1018
tcpConnRemPort.219.182.165.53.1018.219.182.100.2.514 = 514
tcpConnRemPort.219.182.165.53.1020.219.182.165.55.513 = 513
tcpConnRemPort.219.182.165.53.1021.219.182.165.55.513 = 513
tcpConnRemPort.219.182.165.53.1022.219.182.100.2.1019 = 1019
tcpConnRemPort.219.182.165.53.1023.219.182.100.2.514 = 514
tcpConnRemPort.219.182.165.53.1905.219.182.165.55.21 = 21
tcpConnRemPort.219.182.165.53.6000.219.182.100.2.1304 = 1304

The invention claimed is:

1. A method for processing a complex request and to optimize the number of the SNMP requests transmitted through a network, wherein the complex request is addressed to at least one SNMP agent of a resource machine of a computer system from a complex protocol manager of an application machine, the application and resource machines communicating through a network, each agent managing one or more attribute tables belonging to the resource machine, the instances of the tables being referenced by identifiers comprising indexes, the method consisting of:

transforming a first filter derived from a complex request from the manager of the application machine into a second simplified filter comprising only conditions on indexes, the second simplified filter corresponding to the following matching characteristics: the second simplified filter lets through all the SNMP requests whose responses could verify the first filter, based on conditions whose attribute values could verify the first filter, and the second simplified filter filters out all the SNMP requests whose responses cannot in any way verify the first filter because the conditions on indexes associated with said filtered-out SNMP requests do not verify the first filter regardless of attribute values associated with said conditions;

wherein the transforming further comprises deleting from the first filter all conditions that operate on attributes that are not associated with any of said indexes;

limiting the SNMP requests to those that comply with the second simplified filter;

transmitting said limited SNMP requests to the SNMP agent of the resource machine through the network; and applying the first filter to the responses obtained to the SNMP requests, whereby the method makes it possible to process said complex request and to optimize the number of the SNMP requests transmitted through the network.

2. The method according to claim 1, further comprising:

determining a first potential instance that verifies the second simplified filter, based on a test identifier that is less than an identifier of the first potential instance;

finding, using an SNMP request, a solution instance of the table having as its identifier an identifier that is subsequent to the test identifier;

terminating further processing if no solution instance is found;

applying the first filter, said first filter comprising a complex filter, to the solution instance;

determining whether or not the solution instance verifies the first filter;

determining whether or not the first potential instance whose identifier is higher than the identifier of the solution instance and that verifies the second simplified filter;

terminating further processing if the solution instance does not verify the second simplified filter; and if the solution instance verifies the second simplified filter, setting as the test identifier an identifier that is less than the identifier of the first potential.

3. The method according to claim 1, said transforming the first filter into the second simplified filter comprises immediately verifying whether the first filter responds to rules defining filters that are not verified by any instance, said first filter being a complex filter.

4. The method according to claim 1, wherein said transforming the first filter into the second simplified filter comprises:

transforming the first filter into a combination of conditions on the attributes joined by the logical operators AND, OR and NOT, the first filter being a complex filter;

pushing the NOT operators to outer portions of a tree representation of the second simplified filter, and deleting occurrences of double NOTs (NOT NOT);

deleting conditions affecting the attributes that are not indexes;

simplifying the resulting operations by replacing operands;

factoring the nested ANDs and ORs;

gathering the conditions related to the same index; and gathering all the ORs at the route of the filter and simplifying again.

5. The method according to claim 2, further comprising:

scanning the table in its entirety if the second simplified filter includes only the TRUE condition; and wherein no instance can verify the second simplified filter if the second simplified filter includes only the FALSE condition.

6. The method according to claim 2, in which said determining a first potential instance that verifies the second filter comprises:

concatenating a value that verifies a 1st condition $C1_{(i)}$ with a first value that verifies a 2nd condition $C2_{(i)}$, and so on up to an nth condition $Cn_{(i)}$, in order to obtain one or more zero local potential instances $I1\_0_{(i)}.I2\_0_{(i)} \ldots In\_0_{(i)}$; and selecting as the first potential instance the first possible value without a condition on a given index being the null value, the potential instance corresponding to the smallest of the zero local potential instances.

7. The method according to claim 2, in which obtaining the test identifier from the identifier of the potential instance is performed by subtracting one from a last number of the test identifier if the identifier of the potential instance is different from 0, or by deleting the last number if the last number is null.

8. The method according to claim 4, in which said deleting the conditions affecting the attributes that are not indexes comprises replacing the conditions X and NOT X with the constant TRUE.

9. The method according to claim 4, in which said simplifying the resulting operations comprises:

replacing AND and OR tests associated with only one operand with the one operand;

replacing AND operations containing only TRUE operands with the constant TRUE, and replacing OR operations containing only FALSE operands with the constant FALSE;

removing TRUE conditions from other AND operations, and removing FALSE conditions from the other OR operations;

replacing OR operations containing at least one TRUE operation with the constant TRUE, and replacing AND operations containing at least one FALSE operand with the constant FALSE;

replacing conditions that are always TRUE or FALSE with the constant TRUE or FALSE; and repeating said simplifying the resulting operations until no further simplifying is possible.

10. The method according to claim 6, further comprising:

performing, for any variable i and as long as an index p is greater than 0, or as long as no instance searched for has been found, the following operations if there exists a value $Jp_{(i)}>Ip$ that verifies the condition $Cp_{(i)}$, then the local potential instance is formed by for any index k<p, take the value Ik with I1.I2 . . . In being the identifier of the solution instance;

for the index p, take the value $Jp_{(i)}$; and for any index k>p, take the value $Ik\_0_{(i)}$;

Otherwise, p takes the value p−1 and the method repeats the above operations, the potential instance corresponding to the smallest of the local potential instances obtained.

11. A system for processing complex requests and for optimizing the number of the SNMP requests transmitted through a network, the complex request addressed to at least one SNMP agent of a resource machine of a computer system from a complex protocol manager of an application machine, each said agent being configured to manage one or more attribute tables associated with the resource machine, in which instances of the tables are referenced by identifiers comprising indexes, the system consisting of:

an integrating agent configured to transform a first filter derived from a complex request from the manager of the application machine into a second simplified filter comprising only conditions on indexes, the second simplified filter corresponding to the following matching characteristics: the second simplified filter lets through all the SNMP requests whose responses could verify the first filter, based on conditions whose attribute values could verify the first filter, and the second simplified filter filters out all the SNMP requests whose responses cannot in any way verify the first filter because the conditions on indexes associated with said filtered-out SNMP requests do not verify the first filter regardless of attribute values associated with said conditions;

wherein the transforming further comprises deleting from the first filter all conditions that operate on attributes that are not associated with any of said indexes; and the integrating agent further configured to limit the SNMP requests to those that comply with the second simplified filter, to transmit said limited SNMP requests to the SNMP agent of the resource machine through the network, and to apply the first filter to the responses obtained to the SNMP requests, whereby the system makes it possible to process said complex request and to optimize the number of the SNMP requests transmitted through the network.

12. A method for processing a complex request and to optimize the number of the SNMP requests transmitted through a network, wherein the complex request is addressed to at least one SNMP agent of a resource machine of a computer system from a complex protocol manager of an application machine, wherein the complex request addressed to the agent from the manager comprises SNMP attributes managed by the agent and capable of being represented by a filter constituted by any number of conditions on any number of attributes, linked to one another by any number of Boolean operators (AND, OR, NOT, and EX.OR) and the application and resource machines communicate through a network, each agent managing attribute tables belonging to the resource machine, the instances of the tables being referenced by identifiers comprising indexes, consisting of:

transforming a complex filter derived from the complex request addressed to agent from the manager of the application machine into a simplified filter comprising only conditions on indexes, the simplified filter adapted to let through all the SNMP requests whose responses could verify the complex filter, based on conditions whose attribute values could verify the complex filter, and to filter out all the SNMP requests whose responses cannot in any way verify the complex filter because the conditions on indexes associated with said filtered-out SNMP requests do not verify the first filter regardless of attribute values associated with said conditions;

wherein the transforming further comprises deleting from the complex filter all conditions that operate on attributes that are not associated with any of said indexes;

limiting the SNMP requests to those that comply with the simplified filter;

transmitting said limited SNMP requests to the SNMP agent of the resource machine through the network; and applying the complex filter to the responses obtained to the SNMP requests, whereby the method makes it possible to process said complex request and to optimize the number of the SNMP requests transmitted through the network.

13. A method according to claim 12, wherein an identifier just below an identifier of the potential instance determined is a test identifier, the method further comprising:

1) determining a first potential instance that verifies the simplified filter;
2) using an SNMP request to find an instance of the table having as its identifier an identifier that follows a test identifier and if no instance of the table is found, terminating processing of the method, and if an instance is found, naming the instance found a solution instance;
3) determining whether the solution instance is part of the response to the complex request processed by verifying the complex filter and upon verification of the complex filter, applying the complex filter to the solution instance; and
4) determining the first potential instance whose identifier is higher than the identifier of the solution instance and that verifies the simplified filter and terminating processing of the method if no instance is found, and if an instance is found, naming the identifier that is just below the identifier of the potential instance a test identifier and resuming the step of using the SNMP request to find the instance of the table having as its identifier the identifier that follows the test identifier.

14. The method according to claim 12, further comprising:
in order to obtain the simplified filter,
    transforming the complex filter into a combination of conditions on the attributes joined by the logical operators AND, OR and NOT;
    pushing NOT operators to the leaves of a tree representing the simplified filter and deleting double NOTs (NOT NOT);
    deleting the conditions X affecting the attributes that are not indexes;
    simplifying the resulting operations;
    factoring the nested ANDs and ORs;
    gathering the conditions related to the same index; and
    gathering all the ORs at the route of the filter and simplifying the resulting operations again.

15. A method according to claim 13, wherein in the first step, after simplification, the simplified filter is reduced to:
    only the TRUE condition, in which case the table is scanned in its entirety; and
    only the FALSE condition, in which case no instance can work.

16. The method according to claim 13, further comprising:
in order to obtain the simplified filter, immediately verifying whether the complex filter responds to rules defining filters that are not verified by any instance.

17. The method according to claim 13, further comprising:
in order to obtain the simplified filter,
    transforming the complex filter (F1) into a combination of conditions on the attributes joined by the logical operators AND, OR and NOT;
    pushing NOT operators to the leaves of a tree representation of the simplified filter and deleting double NOTs (NOT NOT);
    deleting the conditions X affecting the attributes that are not indexes;
    simplifying the resulting operations;
    factoring the nested ANDs and ORs;
    gathering the conditions related to the same index; and
    gathering all the ORs at the route of the filter and simplifying the resulting operations again.

18. The method according to claim 13, wherein the step of determining the first potential instance that verifies the simplified filter comprises concatenating the first value that verifies a 1st condition $C1_{(i)}$ with the first value that verifies a 2nd condition $C2_{(i)}$, and so on up to an nth condition $Cn_{(i)}$, in order to obtain zero local potential instances $I1\_0_{(i)}.I2\_0_{(i)}\ldots In\_0_{(i)}$, the first possible value without a condition on a given index being the null value, the potential instance corresponding to the smallest of the zero local potential instances.

19. The method according to claim 13, wherein the steps of determining the first potential instance that verifies the simplified filter and the first potential instance whose identifier is higher than the identifier of the solution instance consist of obtaining the test identifier from the identifier of the potential instance, by subtracting one from its last number if the latter is different from 0, or by deleting this last number if it is null.

20. A method according to claim 14, comprising replacing the conditions X and NOT X with the constant TRUE in order to delete the conditions X.

21. The method according to claim 14, wherein the step of determining the first potential instance that verifies the simplified filter comprises concatenating the first value that verifies a 1st condition $C1_{(i)}$ with the first value that verifies a 2nd condition $C2_{(i)}$, and so on up to an nth condition $Cn_{(i)}$, in order to obtain zero local potential instances $I\_0_{(i)}.I2\_0_{(i)}\ldots In\_0_{(i)}$, the first possible value without a condition on a given index being the null value, the potential instance corresponding to the smallest of the zero local potential instances.

22. The method according to claim 14, wherein the steps of determining the first potential instance that verifies the simplified filter and the first potential instance whose identifier is higher than the identifier of the solution instance consist of obtaining the test identifier from the identifier of the potential instance, by subtracting one from its last number if the latter is different from 0, or by deleting this last number if it is null.

23. The method according to claim 15, further comprising:
in order to obtain the simplified filter, immediately verifying whether the complex filter responds to rules defining filters that are not verified by any instance.

24. The method according to claim 15, further comprising:
in order to obtain the simplified filter,
- transforming the complex filter into a combination of conditions on the attributes joined by the logical operators AND, OR and NOT;
- pushing NOT operators to the leaves of a tree representation of the simplified filter and deleting double NOTs (NOT NOT);
- deleting the conditions X affecting the attributes that are not indexes;
- simplifying the resulting operations;
- factoring the nested ANDs and ORs;
- gathering the conditions related to the same index; and
- gathering all the ORs at the route of the filter and simplifying the resulting operations again.

25. The method according to claim 15, wherein the step of determining the first potential instance that verifies the simplified filter comprises concatenating the first value that verifies a 1st condition $C1_{(i)}$ with the first value that verifies a 2nd condition $C2_{(i)}$, and so on up to an nth condition $Cn_{(i)}$, in order to obtain zero local potential instances $I\_0_{(i)}.I2\_0_{(i)}$ . . . $In\_0_{(i)}$, the first possible value without a condition on a given index being the null value, the potential instance corresponding to the smallest of the zero local potential instances.

26. The method according to claim 15, wherein the steps of determining the first potential instance that verifies the simplified filter and the first potential instance whose identifier is higher than the identifier of the solution instance consist of obtaining the test identifier from the identifier of the potential instance, by subtracting one from its last number if the latter is different from 0, or by deleting this last number if it is null.

27. A method according to claim 16, further comprising:
in order to obtain the simplified filter,
- transforming the complex filter into a combination of conditions on the attributes joined by the logical operators AND, OR and NOT;
- pushing NOT operators to the leaves of a tree representation of the simplified filter and deleting double NOTs (NOT NOT);
- deleting the conditions X affecting the attributes that are not indexes;
- simplifying the resulting operations;
- factoring the nested ANDs and ORs;
- gathering the conditions related to the same index; and
- gathering all the ORs at the route of the filter and simplifying the resulting operations again.

28. The method according to claim 16, having AND and OR operations and comprising further simplifying operations, the method comprising:
- replacing AND and OR operations having only one operand with said one operand;
- replacing AND operations containing only TRUE operands with a constant TRUE, and replacing OR operations containing only FALSE operands with a constant FALSE;
- removing TRUE conditions from the other AND operations, and removing FALSE conditions from the other OR operations;
- replacing OR operations containing at least one TRUE operation with a constant TRUE, and replacing AND operations containing at least one FALSE operand with a constant FALSE;
- replacing conditions that are always TRUE with a constant TRUE, and replacing conditions that are always FALSE with a constant FALSE; and
- repeating each said further simplifying operation as many times as it is possible to do so.

29. The method according to claim 16, wherein the step of determining the first potential instance that verifies the simplified filter comprises concatenating the first value that verifies a 1st condition $C1_{(i)}$ with the first value that verifies a 2nd condition $C2_{(i)}$, and so on up to an nth condition $Cn_{(i)}$, in order to obtain zero local potential instances $I\_0_{(i)}.I2\_0_{(i)}$ . . . $In\_0_{(i)}$, the first possible value without a condition on a given index being the null value, the potential instance corresponding to the smallest of the zero local potential instances.

30. The method according to claim 16, wherein the steps of determining the first potential instance that verifies the simplified filter and the first potential instance whose identifier is higher than the identifier of the solution instance consist of obtaining the test identifier from the identifier of the potential instance, by subtracting one from its last number if the latter is different from 0, or by deleting this last number if it is null.

31. A method according to claim 17, comprising replacing the conditions X and NOT X with the constant TRUE in order to delete the conditions X.

32. The method according to claim 28, having AND and OR operations and comprising further simplifying operations, the method comprising:
- replacing AND and OR operations having only one operand with said one operand;
- replacing AND operations containing only TRUE operands with a constant TRUE, and replacing OR operations containing only FALSE operands with a constant FALSE;
- removing TRUE conditions from the other AND operations, and removing FALSE conditions from the other OR operations;
- replacing OR operations containing at least one TRUE operation with a constant TRUE, and replacing AND operations containing at least one FALSE operand with a constant FALSE;
- replacing conditions that are always TRUE with a constant TRUE, and replacing conditions that are always FALSE with a constant FALSE; and
- repeating each said further simplifying operation as many times as it is possible to do so.

33. The method according to claim 18, wherein the step of determining the first potential instance whose identifier is higher than the identifier of the solution instance comprises performing, for any variable i and as long as the index p is greater than 0 or as long as no instance searched for has been found, the following operations:
if there exists a value $Jp_{(i)} > Ip$ that verifies the condition $Cp_{(i)}$, then the local potential instance is formed in the following way:
- for any index $k < p$, we take the value Ik with I1.I2 . . . In being the identifier of the solution instance;
- for the index p, we take the value $Jp_{(i)}$; and
- for any index $k > p$, we take the value $Ik\_0_{(i)}$;
- otherwise p takes the value p−1 and the method repeats the above operations, the potential instance corresponding to the smallest of the local potential instances obtained.

34. The method according to claim 18, wherein the steps of determining the first potential instance that verifies the simplified filter and the first potential instance whose identifier is higher than the identifier of the solution instance consist of obtaining the test identifier from the identifier of the potential instance, by subtracting one from its last number if the latter is different from 0, or by deleting this last number if it is null.

35. The method according to claim 20, having AND and OR operations and comprising further simplifying operations, the method comprising:

replacing AND and OR operations having only one operand with said one operand;

replacing AND operations containing only TRUE operands with a constant TRUE, and replacing OR operations containing only FALSE operands with a constant FALSE;

removing TRUE conditions from the other AND operations, and removing FALSE conditions from the other OR operations;

replacing OR operations containing at least one TRUE operation with a constant TRUE, and replacing AND operations containing at least one FALSE operand with a constant FALSE;

replacing conditions that are always TRUE with a constant TRUE, and replacing conditions that are always FALSE with a constant FALSE; and repeating each said further simplifying operation as many times as it is possible to do so.

36. The method according to claim 20, wherein the step of determining the first potential instance that verifies the simplified filter comprises concatenating the first value that verifies a 1st condition $C1_{(i)}$ with the first value that verifies a 2nd condition $C2_{(i)}$, and so on up to an nth condition $Cn_{(i)}$, in order to obtain zero local potential instances $I\_0_{(i)}.I2\_0_{(i)} \ldots In\_0_{(i)}$, the first possible value without a condition on a given index being the null value, the potential instance corresponding to the smallest of the zero local potential instances.

37. The method according to claim 20, wherein the steps of determining the first potential instance that verifies the simplified filter and the first potential instance whose identifier is higher than the identifier of the solution instance consist of obtaining the test identifier from the identifier of the potential instance, by subtracting one from its last number if the latter is different from 0, or by deleting this last number if it is null.

38. A method according to claim 24, comprising replacing the conditions X and NOT X with the constant TRUE in order to delete the conditions X.

39. The method according to claim 24, having AND and OR operations and comprising further simplifying operations, the method comprising:

replacing AND and OR operations having only one operand with said one operand;

replacing AND operations containing only TRUE operands with a constant TRUE, and replacing OR operations containing only FALSE operands with a constant FALSE;

removing TRUE conditions from the other AND operations, and removing FALSE conditions from the other OR operations;

replacing OR operations containing at least one TRUE operation with a constant TRUE, and replacing AND operations containing at least one FALSE operand with a constant FALSE;

replacing conditions that are always TRUE with a constant TRUE, and replacing conditions that are always FALSE with a constant FALSE; and repeating each said further simplifying operation as many times as it is possible to do so.

40. The method according to claim 25, wherein the step of determining the first potential instance whose identifier is higher than the identifier of the solution instance comprises performing, for any variable i and as long as the index p is greater than 0 or as long as no instance searched for has been found, the following operations:

if there exists a value $Jp_{(i)}>Ip$ that verifies the condition $Cp_{(i)}$, then the local potential instance is formed in the following way:

for any index $k<p$, we take the value Ik with $I1.I2 \ldots In$ being the identifier of the solution instance;

for the index p, we take the value $Jp_{(i)}$; and for any index $k>p$, we take the value $Ik\_0_{(i)}$;

otherwise p takes the value p−1 and the method repeats the above operations, the potential instance corresponding to the smallest of the local potential instances obtained.

41. The method according to claim 27, having AND and OR operations and comprising further simplifying operations, the method comprising:

replacing AND and OR operations having only one operand with said one operand;

replacing AND operations containing only TRUE operands with a constant TRUE, and replacing OR operations containing only FALSE operands with a constant FALSE;

removing TRUE conditions from the other AND operations, and removing FALSE conditions from the other OR operations;

replacing OR operations containing at least one TRUE operation with a constant TRUE, and replacing AND operations containing at least one FALSE operand with a constant FALSE;

replacing conditions that are always TRUE with a constant TRUE, and replacing conditions that are always FALSE with a constant FALSE; and repeating each said further simplifying operation as many times as it is possible to do so.

42. The method according to claim 28, wherein the step of determining the first potential instance that verifies the simplified filter comprises concatenating the first value that verifies a 1st condition $C1_{(i)}$ with the first value that verifies a 2nd condition $C2_{(i)}$, and so on up to an nth condition $Cn_{(i)}$, in order to obtain zero local potential instances $I1\_0_{(i)}.I2\_0_{(i)} \ldots In\_0_{(i)}$, the first possible value without a condition on a given index being the null value, the potential instance corresponding to the smallest of the zero local potential instances.

43. The method according to claim 28, wherein the steps of determining the first potential instance that verifies the simplified filter and the first potential instance whose identifier is higher than the identifier of the solution instance consist of obtaining the test identifier from the identifier of the potential instance, by subtracting one from its last number if the latter is different from 0, or by deleting this last number if it is null.

44. The method according to claim 29, wherein the step of determining the first potential instance whose identifier is higher than the identifier of the solution instance comprises performing, for any variable i and as long as the index p is greater than 0 or as long as no instance searched for has been found, the following operations:

if there exists a value $Jp_{(i)}>Ip$ that verifies the condition $Cp_{(i)}$, then the local potential instance is formed in the following way:

for any index $k<p$, we take the value Ik with $I1.I2 \ldots In$ being the identifier of the solution instance;

for the index p, we take the value $Jp_{(i)}$; and for any index $k>p$, we take the value $Ik\_0_{(i)}$;

otherwise p takes the value p−1 and the method repeats the above operations, the potential instance corresponding to the smallest of the local potential instances obtained.

45. The method according to claim 31, having AND and OR operations and comprising further simplifying operations, the method comprising:

replacing AND and OR operations having only one operand with said one operand;

replacing AND operations containing only TRUE operands with a constant TRUE, and replacing OR operations containing only FALSE operands with a constant FALSE;

removing TRUE conditions from the other AND operations, and removing FALSE conditions from the other OR operations;

replacing OR operations containing at least one TRUE operation with a constant TRUE, and replacing AND operations containing at least one FALSE operand with a constant FALSE;

replacing conditions that are always TRUE with a constant TRUE, and replacing conditions that are always FALSE with a constant FALSE; and repeating each said further simplifying operation as many times as it is possible to do so.

46. The method according to claim 33, wherein the steps of determining the first potential instance that verifies the simplified filter and the first potential instance whose identifier is higher than the identifier of the solution instance consist of obtaining the test identifier from the identifier of the potential instance, by subtracting one from its last number if the latter is different from 0, or by deleting this last number if it is null.

47. The method according to claim 38, having AND and OR operations and comprising further simplifying operations, the method comprising:

replacing AND and OR operations having only one operand with said one operand;

replacing AND operations containing only TRUE operands with a constant TRUE, and replacing OR operations containing only FALSE operands with a constant FALSE;

removing TRUE conditions from the other AND operations, and removing FALSE conditions from the other OR operations;

replacing OR operations containing at least one TRUE operation with a constant TRUE, and replacing AND operations containing at least one FALSE operand with a constant FALSE;

replacing conditions that are always TRUE with a constant TRUE, and replacing conditions that are always FALSE with a constant FALSE; and repeating each said further simplifying operation as many times as it is possible to do so.

48. A system for processing a complex request and to optimize the number of the SNMP requests transmitted through a network, comprising at least one SNMP agent of a resource machine of a computer system to which the complex request is transmitted from a complex protocol manager of an application machine, each agent managing attribute tables belonging to the resource machine, instances of the tables being referenced by identifiers comprising indexes, the system comprising an integrating agent for processing the complex request, means for transforming a complex filter derived from the complex request addressed to agent from the manager of the application machine into a simplified filter comprising only conditions on indexes, the simplified filter adapted to let through all SNMP requests whose responses could verify the complex filter, based on conditions whose attribute values could verify the complex filter, and to filter out all SNMP requests whose responses cannot in any way verify the complex filter because the conditions on indexes associated with said filtered-out requests do not verify the complex filter regardless of attribute values associated with said conditions;

wherein the transforming further comprises deleting from the complex filter all conditions that operate on attributes that are not associated with any of said indexes;

means for limiting SNMP requests to those that comply with the complex filter;

means for transmitting said limited SNMP requests to the SNMP agent of the resource machine through the network; and means for applying the simplified filter to the responses obtained to the SNMP requests, whereby the method makes it possible to process said complex request and to optimize the number of the SNMP requests transmitted through the network.

49. The system for processing as set forth in claim 48 further comprising means for determining the first potential instance that verifies the simplified filter wherein the identifier first below the identifier of the potential instance determined is a test identifier.

50. The system for processing as set forth in claim 49 wherein, using an SNMP request, there is provided means to find the instance of the table having as its identifier the one that follows the test identifier and if no instance is found, terminating the processing method, if an instance is found, naming the instance found a solution instance; and means for determining whether the solution instance is part of the response to the complex request processed by verifying the complex filter and upon verification of the complex filter, applying the complex filter to the solution instance.

* * * * *

UNITED STATES PATENT AND TRADEMARK OFFICE
CERTIFICATE OF CORRECTION

PATENT NO. : 7,653,709 B1 Page 1 of 1
APPLICATION NO. : 09/604919
DATED : January 26, 2010
INVENTOR(S) : Olivier Miakinen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2638 days.

Signed and Sealed this

Twenty-third Day of November, 2010

David J. Kappos
*Director of the United States Patent and Trademark Office*